United States Patent
O'Toole et al.

(10) Patent No.: US 9,479,937 B2
(45) Date of Patent: Oct. 25, 2016

(54) USING A WIRELESS BEACON TO PROVIDE ACCESS CREDENTIALS TO A SECURE NETWORK

(71) Applicant: EBAY INC., San Jose, CA (US)

(72) Inventors: Christopher Diebold O'Toole, San Jose, CA (US); Bryant Genepang Luk, San Jose, CA (US); Robert He, San Jose, CA (US); Jennifer Brenner, San Jose, CA (US); Yu Tang, San Jose, CA (US)

(73) Assignee: EBAY, INC., San Jose, CA (US)

( * ) Notice: Subject to any disclaimer, the term of this patent is extended or adjusted under 35 U.S.C. 154(b) by 0 days.

(21) Appl. No.: 14/466,891

(22) Filed: Aug. 22, 2014

(65) Prior Publication Data

US 2016/0057626 A1    Feb. 25, 2016

(51) Int. Cl.
    *H04W 12/08*    (2009.01)
    *H04L 29/06*    (2006.01)
    *G06Q 30/02*    (2012.01)
    *H04W 4/00*     (2009.01)

(52) U.S. Cl.
    CPC ......... *H04W 12/08* (2013.01); *G06Q 30/0226* (2013.01); *H04L 63/0492* (2013.01); *H04L 63/08* (2013.01); *H04L 63/102* (2013.01); *H04W 4/008* (2013.01)

(58) Field of Classification Search
    CPC ..... H04L 63/08; H04L 63/102; H04L 63/10; G06F 21/6218; H04W 12/06
    USPC .......................................................... 726/4, 5
    See application file for complete search history.

(56) References Cited

U.S. PATENT DOCUMENTS

| | | | |
|---|---|---|---|
| 7,783,299 B2 | 8/2010 | Anderson et al. | |
| 2011/0221568 A1 | 9/2011 | Giobbi | |
| 2012/0226546 A1* | 9/2012 | Chuang | G06Q 30/0207 705/14.33 |
| 2013/0275199 A1 | 10/2013 | Proctor, Jr. et al. | |
| 2013/0309971 A1* | 11/2013 | Kiukkonen | H04L 63/107 455/41.2 |
| 2015/0319102 A1* | 11/2015 | Esdaile | H04L 67/22 709/225 |

* cited by examiner

*Primary Examiner* — Baotran N To
(74) *Attorney, Agent, or Firm* — Haynes and Boone, LLP

(57) ABSTRACT

There are provided systems and methods for using a wireless beacon to provide access credentials to a secure network. A network access device, such as a WiFi router, may provide a secure wireless network requiring access credentials to access the network. For example, the network may be password protected to prevent unauthorized used. Additionally, the network may have various levels of use, such as access depending on a security clearance for a user or data transfer and usage rates. Each of the various levels of use may require a separate access credential. A wireless beacon may be configured to connect to user devices that are near or within an area covered by the network. The connection between a user device and the beacon may be utilized to determine the proper access credential for the user device and push the access credential to the user device.

19 Claims, 5 Drawing Sheets

USING A WIRELESS BEACON TO PROVIDE ACCESS CREDENTIALS TO A SECURE NETWORK

TECHNICAL FIELD

The present application generally relates to network access and more specifically to using a wireless beacon to provide access credentials to a secure network.

BACKGROUND

Various locations may provide secure wireless networks through network access devices, such as WiFi routers providing a password protected network for Internet access. Usage of these networks requires a security credential. However, an administrator of a secure wireless network may wish that the credentials remains unseen to certain users accessing the network, such as guest users visiting a merchant location and/or office building. This allows the administrator to prevent unauthorized usage of the network by users on return visits or once they have concluded their business with the provider of the network. Moreover, the administrators may wish to provide different levels of access to a network. For example, some users may have a security clearance to access other devices on the network, freely search the Internet, or execute other actions while on the network. However, the administrator may wish to prevent guest users from the aforementioned actions. Thus, the administrator must take caution to provide the correct access credentials to each user utilize the network.

Figure 1:
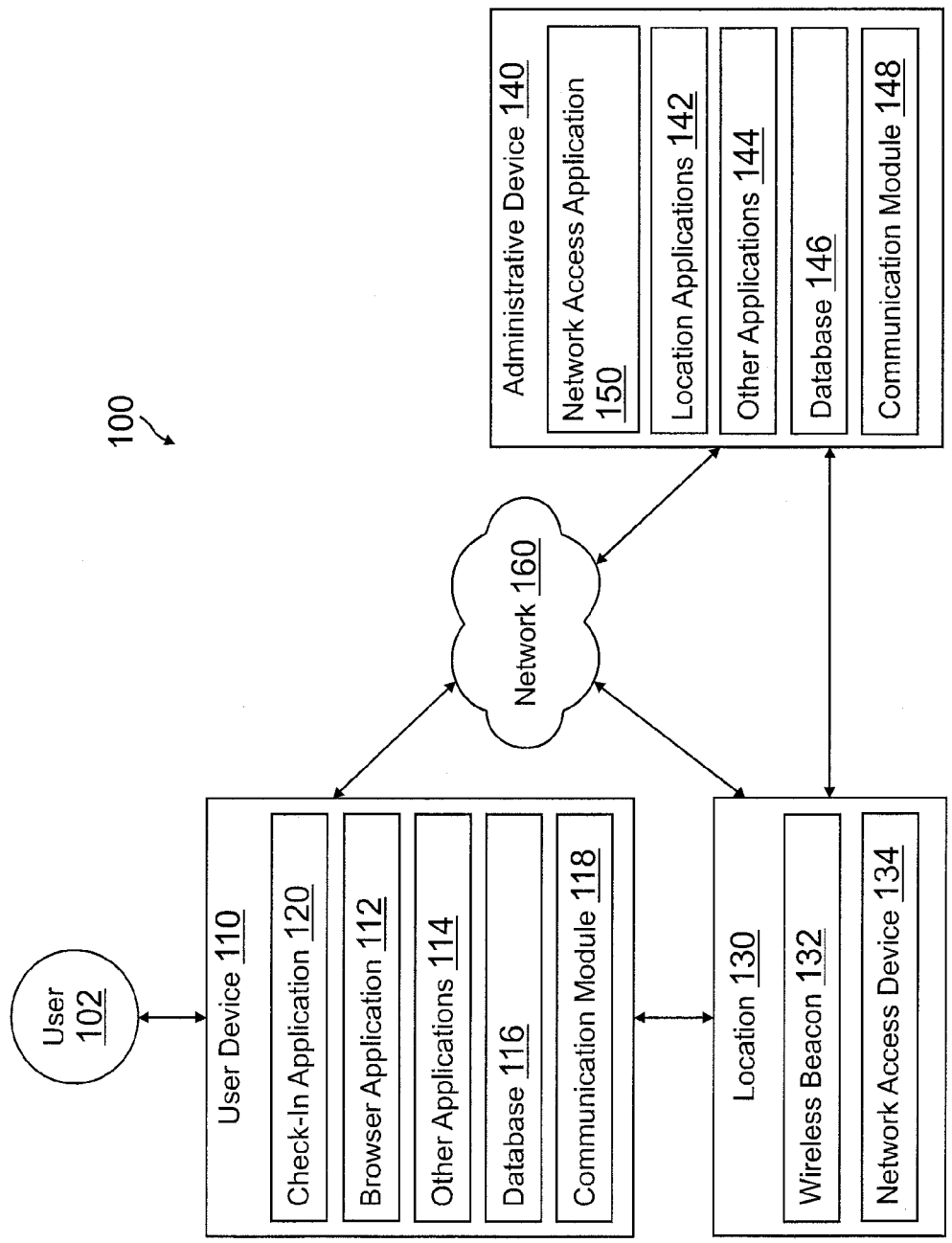
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for using a wireless beacon to provide access credentials to a secure network. Systems suitable for practicing methods of the present disclosure are also provided.

Various locations may provide short range wireless beacons that may communicate with a device, such as through Bluetooth Low Energy (BLE), LTE Direct, or other beacon communication protocol. These beacons may be set up at a location and communicate with the device to alert users of check-in services through their device. The beacons may provide information stored on the beacons. The beacons may also provide communication with a device attached to, or in communication with, the beacon, such as another device of another user corresponding to the location and/or an Internet router. Thus, the beacons may provide additional functionality, such as establishing a connection with a device or server for use in verifying an identity of the user and providing the user's device with information.

An administrator of a protected wireless network (e.g., an owner of a wireless Internet router), may offer check-in services to guest users at a location for the network through the aforementioned wireless beacons. For example, a business, merchant location, office, or other public or private location may provide a protected wireless network through a network access device, where the location further includes wireless beacons configured to connect to devices within or nearby the range of the protected wireless network. The short range wireless beacons may employ BLE, LTE Direct, or other communications that emit a signal receivable by the guest user's device. The communication may include an identifier for the beacon, the administrator, and/or a device/server effectuating the check-in (e.g., an administrative device for the administrator). The guest user's device may be set up to passively monitor for BLE communications. When the guest user's device detects the signal and verifies the identifier, both the device and the beacon may ramp up in power and establish a connection, where the connection may further enable the guest user's device to communicate with another device and/or server effectuating check-in. The beacon may be connected to a networked device at the location or the beacon may include network functionality to communicate with the device/server (e.g., over the wireless network or a cellular network). Thus, the beacon enables the guest user's device to complete a check-in at the location for the network. The check-in may be completed automatically when the guest user's device is in range of the beacon, or may be completed after prompting the guest user to check-in when the guest user's device is in range of the beacon.

Once a connection is established between the user device and the beacon, an administrative device for an administrator of the protected wireless network may determine if the user may access the protected wireless network through the user device. The administrative device may be utilized by an office manager, information technology department, merchant or merchant employee, or other party that may determine and/or view which user device may access the network. In this regard, the administrative device may determine an access right or entitlement for the user device. The access right/entitlement may define if a user and/or the user's device may access the protected wireless network. Further the access right/entitlement may further determine an access level to the network for the user/user device. The access level may determine a security level or clearance for the user device during use of the protected wireless network. In such embodiments, the security clearance for the user device may let the user device perform certain actions or may prevent the user device from performing certain actions. Such actions may include access of other devices, databases, and/or servers connected to the network, usage and searches of the Internet while connected to the network, etc. In other embodiments, the access level may determine a data transfer bandwidth, data transfer amount, and/or data transfer speed for the user device while connected to the network. Thus, a user device with a higher or more trusted access level may be enabled to transfer more data and/or utilize more bandwidth while connected to the wireless network.

The access right and/or access level may be defined by security credentials for the user and/or the user device. Thus, user's working in IT may be given free access to the protected wireless network and devices connected to the protected wireless network, while guest users may be limited to email, basic Internet usages, etc. The security credentials may also define whether the user is entitled to access the network, such as a secure network within a conference room. In such embodiments, only attendees of a meeting or employees of a company may access the protected wireless network.

Furthermore, the access right and/or access level may be determined by user actions while at the location or prior to visiting the location. For example, the location may correspond to a merchant that offers free wireless Internet access while a user is in the store and shopping with the merchant. Thus, to insure other users are not impermissibly using the wireless Internet network, the merchant may require receipts and/or shopping action (e.g., selecting items for purchase, check-in to a sub-location inside of the store, etc.) in order to utilize the network. Thus, the access right and/or access level may be determined by receipts, a transaction history with the merchant, shopping actions, and/or other actions while at the merchant location. The access right and/or access level may be increased based on the shopping actions, such as by providing an increased usage rate of the network for preferred or loyal customers or upgrading usage of the network if the user is purchasing or has purchased expensive items. The user may also establish a loyalty account with the merchant that includes benefits extended to the user. The loyalty account may define the access right and/or access level, such as by allowing the user to utilize the network if the user has a loyalty account and providing increased usage of the network based on benefits within the loyalty account.

An amount of time that the user device has been connected to the wireless beacon or wireless beacons through a location may also define the access right and/or access level. For example, users quickly visiting a store may not be given wireless Internet usage, while a user spending a significant amount of time shopping may be extended usage of a certain time period. Additionally, if the user device is connected to a wireless beacon for an extended period of time, an upgrade to the access level to the protected wireless network may be extended to the user. The upgrade may entitle the user to utilize a secret or private network within the store, which may extend secret sales to only users on the secret network. The protected wireless network may include devices, such as secure media playback devices, private computer networks, etc. The access right and/or access level may define what devices the user device may have access to on the network, as previously discussed. Thus, a leader of a conference may be given access to secure media playback devices while attendees are only given wireless Internet usage.

The administrative device may push the credential to access the protected wireless network to the user device once an access right and/or access level for the network is determined for the user. The credential may be pushed as encrypted and/or time sensitive data, which may be later removed and/or revoked from the user device. The credential may be removed after a time period expires or after a certain time occurs, such as a closing of a store or business. Additionally, the credential may be removed if the user disconnects from one or more of the wireless beacon and the protected wireless network provided by the network access device.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a location 130 having a wireless beacon 132 and a network access device 134, an administrative device 140 in communication over a network 160. User 102, such as a guest user requesting access to a protected wireless network provided by network access device 134, may utilize user device 110 to connect to wireless beacon 132 while at location 130. Administrative device may determine an access right or entitlement for user 102 to utilize the network. If the user is authorized to access the network, administrative device may push or may have wireless beacon 132 push the credentials of the network to user device 110, which later may be removed from user device 110.

User device 110, wireless beacon 132, and network access device 134 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with wireless beacon 132 and/or network access device 134. For example, in one embodiment, user device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 120, a browser application 112, other applications 114, a database 116, and a communication module 118. Check-in application 120, browser application 112, and other applications 114 may correspond to processes, procedures, and/or applications executable by a hardware processor, for example, a software program. In other embodiments, user device 110 may include additional or different software as required.

Check-in application 120 may be used by user 102 of user device 110 to transmit check-in information for processing a check-in for user 102. Check-in application 120 may correspond to a specific application utilized by user device 110, with wireless beacon 132 and/or administrative device 140 to complete a check-in for location 130 and/or network access device 134. The check-in may correspond to a process to log in to a user account of user 102 (e.g., a user account for a protected wireless network provided by network access device 134 and/or a user account with administrative device 140, such as a loyalty account or security account). In other embodiments, the check-in may provide and/or verify the identity of user 102, including transmission of an identifier for user 102 and/or user device 110. The check-in may be completed over network 160 with administrative device 150. In such embodiments, check-in application 120 may correspond more generally to browser application 112 configured to communicate with the entity providing the user account. In other embodiments, a check-in need not be completed over network 160 and an identifier or other identification information for user 102 and/or user device 110 may be provided to administrative device 140.

Check-in application 120 may also receive short range wireless communications from wireless beacon 132 at location 130 and complete a check-in that associates user 102 with wireless beacon 132 at location 130. For example, location 130 may include wireless beacon 132 configured to connect to user device 110 at location 130 or a sub-area within location 130. Wireless beacons 132 may be established nearby or within an area covered by a protected wireless network provided by network access device 134 so that wireless beacon 132 is set up to communicate with user device 110 when user device 110 is in proximity to network access device 134 and can access the protected wireless network. In such examples, wireless beacon 132 may be set up at an entryway, meeting room, conference room, sub-area or other area at location 130 that provides and is covered by the protected wireless network. Check-in application 120 may transmit check-in information to wireless beacon 130 for use in processing the check-in for user 102. As previously discussed, in other embodiments, a check-in for user 102 need not be processed using wireless beacon 132, and instead user device 110 may provide an identifier or other identification information for user 102 and/or user device 110 to wireless beacon 132. The check-in information, identifier, and/or other identification information may be used to determine an access right and/or access level for user 102 and/or user device 110 with the protected wireless network offered by network access device 134, as will be explained in more details herein.

Check-in application 120 may execute in the background of an operating system of user device 110 and be configured to establish connections, using communication module 118 of user device 110, with wireless beacon 132 at a location corresponding to a network provided by network access device 134. The connection may be established with or without user input from user 102. For example, wireless beacon 132 may broadcast a token, such as a universally unique identifier (UUID), for reception by check-in application 120, as will be explained in more detail herein. Check-in application 120 may utilize communication module 118 of user device 110 to receive the token from wireless beacon 132. If check-in application 120 acknowledges the UUID as identifying wireless beacon 132, network access device 134, a network corresponding to network access device 134, and/or administrative device 140 (e.g., if check-in application 120 determines the UUID corresponds to a request to complete a check-in for a server offering check-in services), check-in application 120 may transmit check-in information and/or an identifier corresponding to user 102 and/or user device 110 back to wireless beacon 132. Check-in application 120 may utilize communication module 118 of user device 110 to communicate with wireless beacon 132 (e.g., over near field communication, Bluetooth, Bluetooth Low Energy, radio, infrared, or other connection). The identifier from user device 110 may include, be transmitted with, concatenated with, or otherwise bundled with the identifier received from wireless beacon 132.

Once a connection is established with wireless beacon 132, user device 110 may be checked-in to location 130 and/or network access device 134 if user 102 has not previously been checked-in. The check-in process may further associate user 102 with wireless beacon 132 used to check-in user 102. For example, a user/administrator corresponding to administrative device 140 (e.g., a merchant/merchant employee, a technology representative, a business owner or manager, etc.) for a protected wireless network provided by network access device 134 may previously register wireless beacon 132 as corresponding to the wireless network for network access device 134 (nearby or within the protected wireless network). Thus, administrative device 140 in communication with wireless beacon 132 may be informed that user 102 is in proximity to the protected wireless network because user 102 is checked-in to wireless beacon 132 using user device 110. In various embodiments, user 102 may be associated generally with location 130 and network access device 134 serving location 130. However, in other embodiments, wireless beacon 132 and network access device 134 may correspond to a sub-area of location 130 (e.g., a conference room, an area of a merchant store, etc.). Thus, user 102 may be associated with the sub-area in such embodiments.

Check-in application 120 may also transmit and/or receive information utilized by user device 110. For example, check-in application 120 may receive information for network access device 134, including an access credential for a protected wireless network offered by network access device 134. The information may assist user device 110 in accessing the network, such as by providing access to the network based on user 102's access right/entitlement to the network. The network access credentials may be transmitted as a data token, which may be removed, erased, or revoked when user device 110 disconnects from one or more of wireless beacon 132 and/or the protected wireless network. User device 110 may utilize communication module 118 to receive the aforementioned information. Check-in application 120 may display to user 102 in an application interface of check-in application 120 that user device 110 has received the credential and may access the network. However, as previously discussed, the credential may be hidden, encrypted, or otherwise invisible to user 102 so that user 102 may not be informed of the credential. Thus, user device 110 may alert user 102 that user device has connected to the protected wireless network and may not provide information about the credential and/or network connectivity status in check-in application 120.

Once check-in application 120 has received the credential for the protected wireless network provided by network access device 134, user device 110 may access the network and configure user device 110 to utilize the network for data transfers. Additionally, the credential for accessing the network may correspond to an access level for utilizing the network. The access level may determine the rights, uses, data transfer rates, and/or security clearance for user 102 and/or user device 110 while utilizing the network. The access level may be determined using the check-in information and/or identifier for user 102, as will be explained in more detail herein. The access level may be displayed to user 102 through check-in application 120 or may remain hidden from user 102. The credential defined by the access level may also alter which protected wireless network provided by network access device 134 and/or other network access devices may be utilized by user 102. For example, a first credential may allow use of only a base network, while a second credential may enable use of the base and/or an upgraded network (e.g., one offering faster data transfer, increased security clearance, secret sales, etc., as will be explained in more detail herein). User device 110 and/or check-in application 120 may also provide a user interface that permits user 102 to view available networks, access networks for which check-in application 120 possesses credentials, and disconnect from one or more of the networks. Check-in application 120 may provide user 102 with information for the networks, such as a name, owner/administrator of the network, amount and type of data transferred over one or more of the networks, and/or data security (e.g., privacy information) for user device 110 and data stored on user device 110.

Browser application 112 may be used, for example, to provide a convenient interface to permit user 102 to browse the Internet, including navigation to websites and between webpages of websites. Browser application 112 may therefore be configured to transmit and receive information, such as webpage requests, input to webpages, downloads and uploads of data in database 116 of user device 110, etc. Thus, when user device 110 is connected to a network, browser application 112 may utilize network bandwidth to communicate data over the network. Where the network is a cellular communication network, data transfers by browser application 112 may require a data plan, which may include a limit on the amount of data transferable over a period of time by user device 110. Thus, user 102 may wish to utilize a WiFi or other network provided by network access device 134 to access and transfer data over the Internet to avoid usage of the data plan and potentially increase data transfer speeds. As previously discussed, user 102 may therefore utilize check-in application 120 to request a credential to access a protected wireless network and input the credential to an access the network.

Browser application 112 may be utilized while connected to the protected wireless network to browse the Internet. In various embodiments, browser application 112 may more generally correspond to applications that may be further utilized to connect to other devices, servers, and/or components of the protected wireless network to utilize such components. For example, browser application 112 may be utilized to access and use a media device, such as a monitor, television, or other display device by user device 110 (e.g., to utilize during a presentation in a conference room). The access level determined for user device 110 may determine the rights of browser application 112 to browse the Internet, utilize the connected components, and/or perform other actions while connected to the protected wireless network. Thus, browser application 112 may be limited by the credential supplied to used device 110 for connecting to the network.

In various embodiments, various features of check-in application 120 and/or browser application 112 may be incorporated in the same application so as to provide their respective features in a single application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice, and IM applications that allow a user to send and receive emails, calls, texts, and other notifications through network 160. In various embodiments, other applications 114 may include financial applications, such as banking, online payments, money transfer, or other applications associated with a payment provider server. Other applications 114 may include mapping or other applications that show a range and/or location of a protected wireless network provided by network access device 134. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 120, browser application 112, and/or other applications 114, identifiers associated with hardware of user device 110, or other appropriate identifiers, such as identifiers used for payment/user/device authentication or identification. Identifiers in database 116 may be used by administrative device 140 to associate user device 110 with a particular account maintained by administrative device 140. Identifiers in database 116 may be used by check-in application 120 to identify user 102 and/or user device 110 during check-in with wireless beacon 132. Database 116 may include user device tokens and/or encryption keys, including an encryption key of wireless beacon 132, network access device 134, a protected wireless network provided by network access device 134, and/or administrative device 140. Database 116 may include identifying information for tokens enabling check-in application 120 to identify the aforementioned entities when receiving a corresponding token. Information in database 116 may be utilized to authorize user 102 to access a network provided by network access device 134, such as a credential or credentials for a protected wireless network.

User device 110 includes at least one communication module 118 adapted to communicate with wireless beacon 132, network access device 134, and/or administrative device 140 over network 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 132 and/or network access device 134 using short range communications, such as radio frequency, infrared, Bluetooth, LTE Direct, WiFi and near field communications.

Location 130 may correspond to a physical location where a network access device, such as a wireless Internet router, provides a network for use by user device 110. In this regard, the network offered at location 130 may correspond to a protected wireless network requiring a credential to access and utilize the protected wireless network. In various embodiments, location 130 may correspond to an office, a business, a merchant location, a storefront, a mall or retail location, or other location where a protected wireless network may be offered to user 102 for use by user device 110. Thus, location 130 may include various features to provide limited and/or unlimited access to the protected wireless network for users visiting location 130.

Location 130 of FIG. 1 includes wireless beacon 132 and a network access device 134 configured to provide a protected wireless network accessible using wireless beacon 132. Wireless beacon 132 and/or network access device 134 may include hardware and software necessary to execute the processes and functions as described below. In other embodiments, location 130 may include additional hardware and/or software as required to process the above and below described features offered by location 130.

Wireless beacon 132 may be maintained, for example, by an administrator corresponding to administrative device 140, such as a business owner, a merchant, an office manager, or other entity offering a network accessible at location 130. Wireless beacon 132 may be implemented using any appropriate hardware and software configured for wireless communication with user device 110. For example, in one embodiment, wireless beacon 132 may be implemented as a dongle device including a hardware processor and a communication module, for example, connected to administrative device 140. Wireless beacon 132 may also be implemented as devices incorporated within a personal computer (PC), a smart phone, laptop computer, and/or other types of computing devices capable of transmitting and/or receiving data, such as an IPAD® from APPLE®. Wireless beacon 132 may also act as a stand-alone device including a processor, communication module, and/or network interface component configured to communicate with user device 110 and/or payment provider server 170. Although wireless beacon 132 is described singly, a plurality of wireless beacons may established at location 130, with one or more corresponding to a protected wireless network offered by network access device 134.

Wireless beacon 132 of FIG. 1 contains processes, procedures, and/or applications, for example, a software program, executable by a hardware processor configured to interact with user device 110, network access device 134, and/or administrative device 140. Thus, regardless of the implementation of wireless beacon 132 as discussed above, wireless beacon 132 may utilize a connection/check-in process and include or be connected to a communication module. In other embodiments, wireless beacon 132 may include additional or different hardware and software as required.

Wireless beacon 132 may include an application for transmitting requests to establish a connection between a device (e.g., user device 110) and wireless beacon 132. The requests may be unique to wireless beacon 132, thereby identifying wireless beacon 132. Wireless beacon 132 may utilize short range wireless communications of wireless beacon 132 to transmit the requests to establish a connection, including an identifier such as a Universally Unique Identifier (UUID). If user device 110 receives a request to establish the connection with wireless beacon 132 and responds with an identifier for user 102/user device 110 (potentially including the UUID and other information necessary to effectuate a check-in for user 102, as previously discussed), wireless beacon 132 to ramp up in power and create a connection between user device 110 and wireless beacon 132.

Wireless beacon 132 may transmit the request to establish the connection with wireless beacon 132 as a short range wireless communication (e.g. a BLE protocol communication) including a "wake up" process for check-in application 112 of user device 110 and/or a token for wireless beacon 132 transmitting the request. In other embodiments, the request and/or connection may utilize near field communication, radio communication, infrared communication, or Bluetooth communication. Additionally, although wireless beacon 132 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 132 (e.g., user device 110) and establishment of a connection for data transfers. In other embodiments, wireless beacon 132 may correspond to other devices, such as WiFi capable devices, near field communication devices, etc.

The request may be specific to user device 110 by including information that is specific to user 102 and/or user device 110, such as a name, identifier, or user device identifier. The information specific to user 102 may be determined from a user account of user 102 or other information previously provided to administrative device 140 (e.g., a user account established with administrative device 140, such as a security account, loyalty account, etc.). Thus, in certain embodiments, only user device 110 will pick up and authenticate the request, for example, if user 102 has previously performed a transaction with the merchant corresponding to merchant location 130/administrative device 140. For example, user 102 may have generated a receipt or a transaction history with the merchant, or may create a prepopulated return order form for a purchase with the merchant.

After wireless beacon 132 receives an identifier from user device 110, wireless beacon 132 may determine user 102 is in proximity to wireless beacon 132. Wireless beacon 132 may pass the identifier (and any other device's identifiers where applicable) to administrative device 140 to associate user 102 (and the other users where applicable) with the wireless beacon 132. By associating user 102 with wireless beacon 132, administrative device 140 may determine that user device 110 is near or within a range covered by the protected wireless network offered by network access device 134 and may be requesting to access the network.

After check-in information is received from user device 110, administrative device 140 may determine if user device 110 is authorized to access a protected wireless network provided by network access device 134, as will be explained in more detail herein. If user device 110 is authorized to access the network, one or more of wireless beacon 132, network access device 134, and/or administrative device 140 may transmit a credential to user device 110 enabling user device 110 to access the protected wireless network provided by network access device 134. As previously discussed, the credential may be encrypted, hidden, or otherwise obfuscated so that user 102 is unaware of the credential but they still allow access to the network. The credential may comprise a security key or password enabling access to the network. Moreover, the token or information containing the credential passed to user device 110 may be set up to be wiped, removed, or revoked as soon as user device 110 disconnects from wireless beacon 132 and/or the network provided by network access device 134. For example, if user 102 moves sufficiently far away from wireless beacon 134 to disconnect from wireless beacon 134, the credential may be removed from user device 110 by check-in application 120 of user device 110 and/or administrative device 140 over network 160. In other embodiments, when user device 110 disconnects from the network provided by network access device 134 (e.g., actively disconnects based on user 102's input and/or leaves location 130 or a sub-area of location 130 for the network), the credential may be similarly removed from user device 110.

Wireless beacon 132 may utilize a communication module to pass the check-in information and/or identifier for user 102/user device 110 to administrative device 140. Thus, wireless beacon 132 includes a communication module adapted to communicate with user device 110 and/or administrative device 140. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module of wireless beacon 132 may also communicate with user device 110 and/or administrative device 140 using short range communications, such as Bluetooth Low Energy, LTE Direct, WiFi, radio frequency, infrared, Bluetooth, and near field communications.

Network access device 134 corresponding to a device enabling transfer of data information over the Internet. In various embodiments, network access device 134 may include a DSL (e.g., Digital Subscriber Line) modem, a PSTN (Public Switched Telephone Network) modem, an Ethernet device, a WiFi device, a broadband device, a satellite device and/or various other types of wired and/or wireless network communication devices. Network access device 134 may provide a protected wireless network utilized to communicate with other computer networks, including the Internet. For example, network access device 134 may provide a WiFi network. Network access device 134 may be password and/or key protected and users may be required to pay for use of, or amount of data transmitted over, the network. Network access device 134 may communicate directly with wireless beacon 132 using short range communications, such as BLE, radio frequency, infrared, Bluetooth, and near field communications or over network 160.

Administrative device 140 may correspond to a device used by an administrator for location 130 and/or network access device 134. In this regard, administrative device may determine an access right for user 102 and/or user device 110 to utilize a protected wireless network provided by network access device 134. The credential may also correspond to an access level for user 102 and/or user device 110. Administrative device 140 may further transmit a credential to user device 110 if user 102 and/or user device 110 is entitled to access the network. Administrative device 140 may be implemented using any appropriate hardware and software configured for wired and/or wireless communication with user device 110, wireless beacon 132, and/or network access device 134. For example, administrative device 140 may be implemented as a personal computer (PC), a smart phone, laptop computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly. Moreover, in various embodiments, one or more of the applications, processes, and/or features discussed below in reference to administrative device 140 may be provided by wireless beacon 132.

Administrative device 140 of FIG. 1 contains a network access application 150, location applications 142, other applications 144, a database 146, and a communication module 148. Network access application 150, location applications 142, and other applications 144 may correspond to processes, procedures, and/or applications, for example, a software program, executable by a hardware processor. In other embodiments, administrative device 140 may include additional or different software as required.

Network access application 150 may correspond to an application configured to receive check-in information, an identifier, and/or identification information for user 102 and/or user device 110, determine an access right for user 102 and/or user device 110, and transmit a credential to access a protected wireless network provided by network access device 134 to user device 110. In this regard, network access application 150 may correspond to processes to complete check-in with user device 110 with location 130 after receiving check-in information, an identifier, and/or identification information for user 102/user device 110 from wireless beacon 132. Thus, network access application 150 may correspond to the administrative device side application configured to receive check-in information from user device 110 and complete the check-in. The check-in request may include log in information for a user account with administrative device 140 and thus complete the check-in with user 102 by verifying the account information. For example, the check-in information may include an identifier or other account information for a merchant account, loyalty/reward account, payment account, security account (e.g., security clearance), email/messaging account, or other user account of user 102. However, in embodiments where a user account has not been previously established by user 102, network access application 150 may receive other information identifying user 102. In certain embodiments, network access application 150 may not complete a check-in for user 102 and may utilize the received identification information to determine an access right or entitlement to utilize the protected wireless network and an access level during use of the protected wireless network.

Once information for user 102 has been received, network access application 150 may determine an access right and/or entitlement for user 102 and/or user device 110. As previously discussed, the access right may determine whether user device 110 may utilize a protected wireless network provided by network access device 134. The access right may be determined using information stored to database 146 about user 102 and/or user device 110, such as a user account, access information, or other available data in database 146. For example, user 102 may establish a user account, such as a loyalty account or business account, with administrative device 140. The user account may include information determining whether user 102 and/or user device 110 may access the network. Thus, if user 102 has access or reward benefits entitling user 102 to utilize the network in a loyalty account, network access application 150 may determine user 102 may access the network. In other embodiments, a user account with a business (e.g., an email account), a security account, or other established account may include access rights for user 102 and/or user device 110. Thus, network access application 150 may determine the access right through a user account.

Moreover, an administrator for a protected wireless network provided by network access device 134 may establish the access right for user 102 and/or user device 110. For example, the administrator may utilize administrative device 140 to set an access right for user 102 and/or user device 110 if the administrator knows user 102 may require access to the network or is requesting access to the network. The administrator may set the access right based on past or current actions by user 102, such as previous purchases and/or transaction histories, presentations given or to be given by user 102, current requests by user 102, security clearances of user 102, etc. Once network access application 150 determines an access right for user 102 and/or user device 110, network access application 150 may retrieve a credential to access the protected wireless network and communicate the credential to user device 110. The credential may be communicated to user device 110 over network 160 by administrative device 140. In other embodiments, wireless beacon 132 may also be utilized to communicate the credential to user device 110, for example, using a stored credential after instruction by administrative device 140 or after receiving the credential from administrative device 140. In further embodiments, network access device 134 may similarly be utilized to push the credential to user device 110.

In addition to determining an access right or entitlement to utilize a protected wireless network provided by network access device 134, network access application 150 may also determine an access level for user 102 and/or user device 110 while utilizing the network. An access level may correspond to actions that user device 110 may perform while connected to the network. For example, an access level may correspond to data usage rights, levels, or amounts that user device 110 may perform while connected to the network, such as bandwidth usage, data transfer speeds, etc. Additionally, an access level for user 102 and/or user device 110 may correspond to a security clearance, such as actions, processes, and features user 102 may utilize while connected to the network. Further, the access level may determine what other devices, databases, and/or servers connected to the network that user device 110 may access and/or utilize. For example, media playback devices may be connected to a network within a conference room and may be accessible to user 102 with an access right corresponding to meeting leader, while meeting attendees are prevented from accessing the media playback device through their respective access levels.

An access level for user 102 and/or user device 110 may be determined by network access application 150 utilizing user accounts and/or information stored in database 146, as previously discussed. In certain embodiments, a user account (e.g., a loyalty account, a rewards account, a payment account, a business account, an email account, a security account, etc.) may determine the access level by having a pre-set access level for the user account. A loyalty/rewards account may have an access level based on the preferred customer or loyal customer status. The access level may depend on the level of preferred/loyal customer, such as a high access level for frequent shoppers or shoppers who spend a lot of money with a merchant. The high access level may provide additional benefits, such as use of a private network for sales or higher data speeds. Conversely, new customers or infrequent customers may have a low access level or may be given an access level that incentivizes the customer to shop more frequently at the merchant (e.g., a private network that provides sales to new customers). The access level may be defined by user purchases, receipts, and/or transaction histories in a loyalty/rewards/payment account. Thus, as user 102 accumulates more rewards, spends more money, and/or generates more purchases, user 102 may accrue a high access level and more usage of the protected wireless network offered by network access application 150. In other embodiments, the access level set in the user account may be established by an administrator utilizing administrative device 140, such as when a business or email account is established by user 102. The access level may also correspond to a security clearance set by the administrator, enabling user 102 to perform more or less actions while connected to the network.

The access level may also be established by an administrator using administrative device 140 prior to or when user device 110 requests to access a protected wireless network provided by network access device 134. Thus, the access level may be set and/or adjusted by the administrator and stored to database 116 for use with user device 110. The administrator may set and/or adjust the access level based on actions by user 102, such as purchases at a merchant location, presentations by user 102, data usage by user 102, Internet usage by user 102, etc. For example, if user 102 is requesting additional usage rights in order to complete a presentation (e.g., utilize a media display device), the access level for user 102 may be set or adjusted accordingly.

Based on the access level, a different credential may be provided to user device 110 for connecting to the protected wireless network provided by network access device 134. For example, network access application 150 may provide a first credential to user device 110 that provides limit usage of the network by user device 110 based on a first access level. However, if user device 110 qualifies for a second access level (e.g., through additional purchases, higher security rating, etc.), then a second credential may be provided to user device 110. The second credential may enable expanded or additional usage of the network. In various embodiments, network access device 134 may provide a plurality of protected wireless networks, or a plurality of network access devices may provide the plurality of protected wireless networks. In such embodiments, each network may require a credential to utilize the network and may provide various different usage rates, security, attached device, etc. Thus, network access application 150 may transmit a credential to user device 110 for the network of the plurality of network matching the access level. In still other embodiments, network access application 150 may configure the usage rights and abilities of user device 110 with respect to the access level when or after user device 110 connects to the network. In such embodiments, only one credential may be provided to user device 110, and the access level may determine the usage rights and abilities defined for user device 110 when user device 110 connects to the network.

Location applications 142 may include applications for use with location 130. In various embodiments, location application 142 may correspond to merchant applications, which may provide information for available items and/or services to user 102, complete purchases of items and/or services by user 102, generate receipts and transaction histories for user 102 and/or provide loyalty account services and benefits to user 102. Location applications 142 may therefore provide a convenient interface to permit the merchant to view selected item/service information and complete a transaction for the items/services. Once the transaction is approved, location applications 142 may be utilized to request and process a payment for the items/service, for example, using payment provider server 170. Additionally, location applications 142 may be utilized to establish and maintain a loyalty account for user 102. Loyalty accounts may include benefits and/or rewards for user 102 based on user 102's past transactions with the merchant corresponding to location 130/administrative device 140. Information from merchant applications in location applications 142 may be utilized to determine an access right and/or an access level for user 102/user device 110.

In other embodiments, location applications 142 may correspond to applications offered by a business, such as private network applications, email applications, and other similar business applications. Such business applications may be utilized to establish a user account for user 102, determine a security clearance for user 102, establish and assist meetings and conferences by user 102, etc. Business applications may similarly be utilized to determine an access right and/or access level for user 102/user device 110.

Administrative device 140 includes other applications 144 as may be desired in particular embodiments to provide features to administrative device 140. For example, other applications 144 may include security applications for implementing client-side security features, programmatic client applications for interfacing with appropriate application programming interfaces (APIs) over network 180, or other types of applications. In various embodiments, other applications 144 may include financial applications, such as banking, online payments, money transfer, or other applications that may be utilized to process payments. Other applications 144 may include applications utilized by devices connected to a protected wireless network provided by network access device 134, such as security application, media playback application, and/or other networked or downloadable applications. Other applications 144 may contain other software programs, executable by a processor, including a graphical user interface (GUI) configured to provide an interface to the user.

Administrative device 140 may further include database 146 which may include, for example, identifiers such as operating system registry entries, cookies associated with network access application 150, location applications 142, and/or other applications 144, identifiers associated with hardware of administrative device 140, or other appropriate identifiers, such as identifiers used for payment/user/device authentication or identification. In one embodiment, identifiers in database 146 may be used to associate administrative device 140 with a particular account. Database 146 may also store user 102's information, including check-in information, an identifier, etc., for user 102 and/or user device 110. Database 146 may include user accounts (e.g., loyalty account, payment accounts, etc.) and/or receipts for purchases by user 102 and transaction histories for purchased items by user 102 that may be utilized to determine an access right and/or access level for user 102/user device 110. Information in database 146 may also include business information, such as user accounts and/or pre-set access rights/levels, which may also be utilized to determine an access right and/or access level for user 102/user device 110.

Administrative device 140 includes at least one communication module 148 adapted to communicate with user device 110, wireless beacon 132, and/or network access device 134. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacon 132 using short range communications, such as Bluetooth Low Energy, LTE Direct, radio frequency, infrared, Bluetooth, and near field communications.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
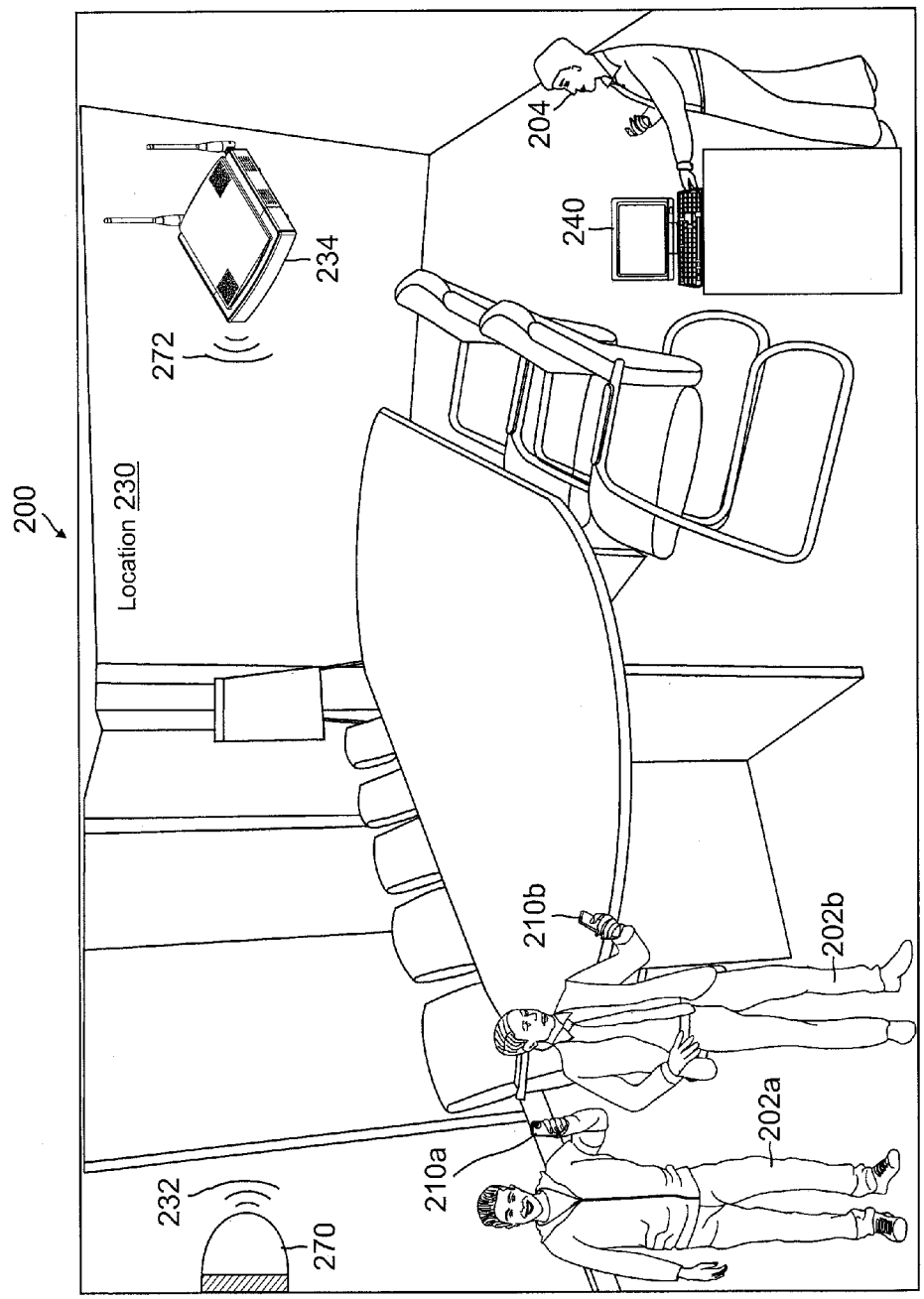
FIG. 2 is an exemplary system environment displaying a guest users receiving network access credentials after completing a check-in with a wireless beacon, according to an embodiment.

FIG. 2 is an exemplary system environment displaying a guest user receiving network access credentials after completing a check-in with a wireless beacon, according to an embodiment. Environment 200 of FIG. 2 includes a user 202*a* utilizing a user device 210*a* and a user 202*b* utilizing a user device 210*b* both corresponding generally to user 102 and user device 110, respectively, of FIG. 1. Environment 200 further includes a wireless beacon 232, a network access device 234, and an administrative device 240 each corresponding generally to wireless beacon 132, network access device 134, and administrative device 140, respectively, of FIG. 1.

Environment 200 includes a location 230 corresponding generally to location 130 of FIG. 1, such as a conference room of an office or other location. An administrator 204 is utilizing administrative device 240 to enter, process, and/or determine access rights and/or access levels for user 202*a* and 202*b*. As users 202*a* and 202*b* enter location 230, user devices 210*a* and 210*b* may receive a communication 270 from wireless beacon 230. As previous discussed, communication 270 may correspond to a request to connect with user devices 210*a* and 210*b*. Communication 270 may further include a request to complete a check-in for users 202*a* and 202*b* using user devices 210*a* and 210*b*, respectively. After receiving communication 270, user devices 210*a* and 210*b* may connect to wireless beacon 232 and transmit an identifier and/or check-in information to wireless beacon 232. In turn, administrative device 240 may receive the identifiers/check-in information for users 202*a*/202*b* and/or user devices 210*a*/210*b* and determine access rights for users 202*a*/202*b* and/or user devices 210*a*/210*b*.

As previously discussed, administrator 204 and/or administrative device 240 may determine access rights for users 202*a*/202*b* and/or user devices 210*a*/210*b* utilizing information entered by administrator 204 and/or user accounts for users 202*a* and 202*b*. For example, administrator 204 may view on administrative device 240 that user devices 210*a* and 210*b* have connected to wireless beacon 232 and are requesting to access a protected wireless network 272 provided by network access device 234. Thus, administrator 204 may configure access rights for user devices 210*a* and 210*b*, or administrative device 240 may determine the access rights using stored data. The access right for user device 210*a* may be different from the access right for user device 210*b*. For example, user 202*a* may correspond to a leader of a presentation in location 230 that may require access to protected wireless network 272 in order to give the presentation. Therefore, the access right for user 202*a* may entitle user device 210*a* to receive a credential to access protected wireless network 272. However, administrator may wish that user 202*b*, an attendee and viewing of the presentation, does not utilize user device 210b to browse the Internet or access protected wireless network 272. Thus, the access right for user 202b may prevent user 202b from receiving the credential for protected wireless network 272. In other embodiments, user 202b may be given access to protected wireless network 272 but may be restricted by their actions while user device 210b is connected to protected wireless network 272, as will be explained in more detail below.

Moreover, an access level for user devices 210a and 210b may be determined and utilized to determine usage rights, levels, and limits while user devices 210a and 210b are connected to protected wireless network 272. As in the previous example, user 202a may correspond to a presenter during a conference or presentation and may require usage of media display devices connected to protected wireless network 272. Thus, the access level set for user device 210a may give user 202a access rights to connected media display and/or playback devices. However, since user 202b is only a viewer of the presentation, user device 210b may be prevented from access to the same media devices if user 202b is given a credential to access protected wireless network 272 through their access right. Moreover, user device 210b may be prevented from other disruptive actions, such as Internet browsing and/or streaming media playback while connected to protected wireless network 272.

Figure 3:
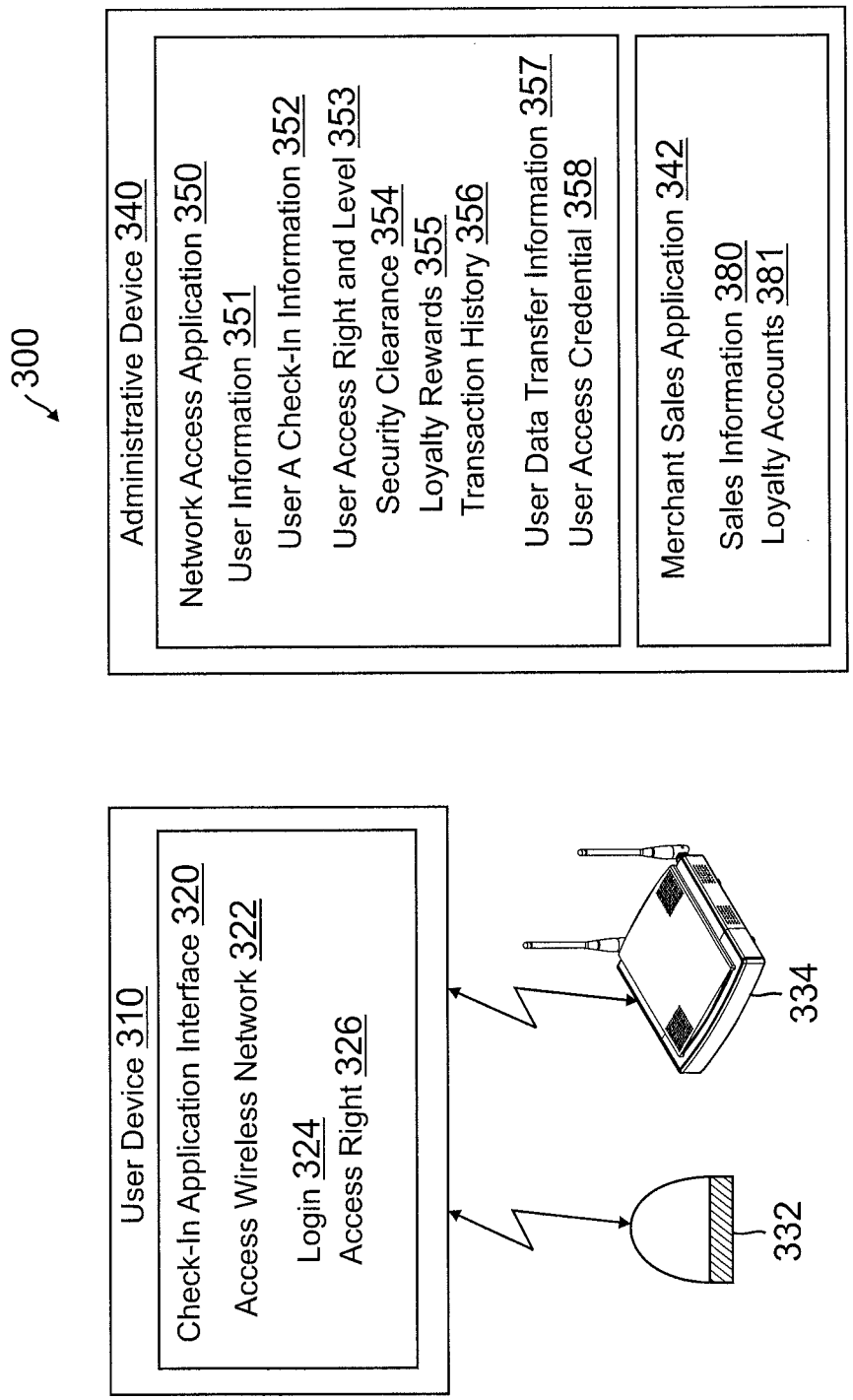
FIG. 3 is an exemplary system environment showing an exemplary network administrative device determining a network access credential for user device from an access right for a user of the user device, according to an embodiment.

FIG. 3 is an exemplary system environment showing an exemplary network administrative device determining a network access credential for user device from an access right for a user of the user device, according to an embodiment. Environment 300 of FIG. 3 includes a user device 310 and an administrative device 340 corresponding generally to user device 110 and administrative device 140, respectively, of FIG. 1. Moreover, environment 300 includes a wireless beacon 332 and a network access router 334 corresponding generally to wireless beacon 132 and network access router 134, respectively, of FIG. 1.

User device 310 displays a check-in application interface 320 corresponding generally to an interface displaying the executed processes and features of check-in application 120 of FIG. 1. As previously discussed, user device 310 may provide administrative device 340 with information used to determine an access right and/or access level for user device 310 and/or the user of user device 310. Prior to transmitting the information to administrative device 340, check-in application interface 320 may request user approval to transmit the information. Thus, check-in application interface includes an access wireless network 322 request, login 324 information, and an access right 326 received from administrative device 340. Access wireless network 322 request may correspond to a button or option that the user of user device 310 may select to initiate a request to access a protected wireless network offered by network access route 334. Thus, selection of access wireless network 322 may cause information for the user to be second to wireless beacon 322. Moreover, prior to transmitting the information check-in application interface 320 may require login 324 to be completed to verify the identity and authenticity of the user.

Administrative device 340 includes a network access application 350 and a merchant sales application 342 corresponding generally to a part or all of the described features and process of network access application 150 and location applications 142, respectively, of FIG. 1. Network access application 350 includes user information 351 that contains identification information (e.g., check-in information and/or an identifier) used to determine access rights and/or access levels for the user of user device 310. In this regard, user information 351 includes user A check-in information 352, user access right and level 353, user data transfer information 357, and user access credential 358. In other embodiments, user information 351 may include further information, data, rights, and/or levels.

User A check-in information 352 may correspond to check-in information and/or identifiers used by network access application 350 to determine user access right and level 353. Thus, after receiving user A check-in information 352, network access application 350 may determine user access right and level 353, such as a right to access a protected wireless network offered by network access device 334. In this regard, user access right and level 353 includes a security clearance 352 (e.g., a right to utilize the network, actions enabled on the network, and/or devices accessible while connected to the network), loyalty rewards 355 (e.g., benefits in a loyalty or rewards account), and transaction history 356 (e.g., receipts, purchases, sales, etc., by the user of user device 310). Moreover, user access right and level 353 may include user access level, such as usage limits while connected to the network. The access level may be determined using security clearance 354, loyalty rewards 355, and/or transaction history 356. Such information may be received from merchant sales application 342, such as sales information 380 and loyalty accounts 381.

Once user device 310 is determined to have an access right to the network, network access application 350 may transfer user access credential 358 to user device 310 to connect to the network provided by network access device 334. Thus, check-in application interface 320 may display to the user that the user has an access right 326 to utilize the network. However, user access credential 358 may still be hidden or obfuscated in access right 326 to prevent unauthorized usage of the network.

Figure 4:
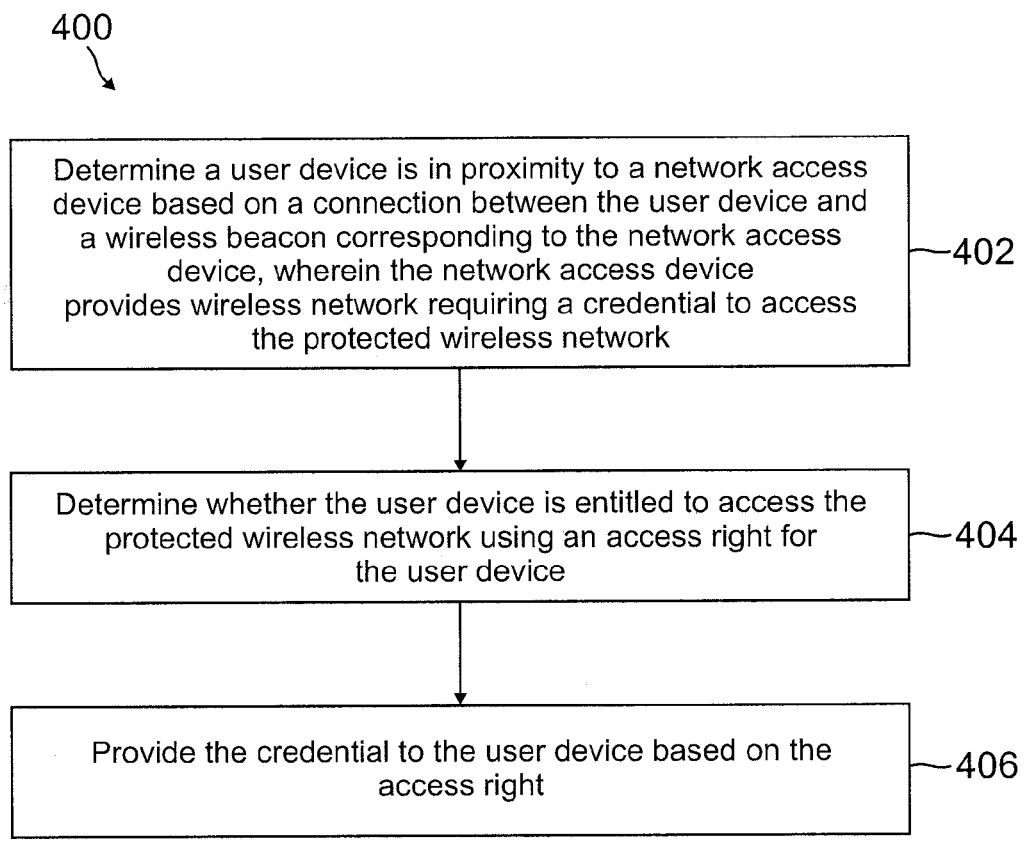
FIG. 4 is a flowchart of an exemplary process for using a wireless beacon to provide access credentials to a secure network, according to an embodiment.

FIG. 4 is a flowchart of an exemplary process for using a wireless beacon to provide access credentials to a secure network, according to an embodiment. Note that one or more steps, processes, and methods described herein may be omitted, performed in a different sequence, or combined as desired or appropriate.

At step 402, a user device is determined to be in proximity to a network access device based on a connection between the user device and a wireless beacon corresponding to the network access device, wherein the network access device provides a protected wireless network requiring a credential to access the protected wireless network. The connection between the user device and the wireless beacon may use one of near field communication, radio communication, infrared communication, Bluetooth communication, Bluetooth low energy communication, LTE Direct communication, and WiFi communication. Moreover, the protected wireless network may comprise or include at least one of a secure media playback device, a wireless internet router, and a secure private computer network.

A determination as to whether the user device is entitled to access the protected wireless network is performed, at step 404, using an access right for the user device. In various embodiments, an access level to the protected wireless network may be determined using the connection or the access right. If check-in information is generated during the connection, the check-in information may determine the access level, a security level, a loyalty/rewards account, or other information indicative of an access level for the user device. The access level may determine a data transfer bandwidth, data transfer amount, or data transfer speed during use of the protected wireless network by the user device. In other embodiments, the access level may determine a security level or security clearance during use of the protected wireless network by the user device. Additionally, a loyalty account with a merchant by a user of the user device may comprise or include the access level, wherein the loyalty account further comprises benefits with the merchant that determine the access level. The loyalty account may further include a transaction history with the merchant by the user that further determines the access level by determining the benefits extended to the user.

In various embodiments, a security rating may also be determined using the connection, check-in information, identifier, or other information for the user device and/or a user of the user device. The security rating may comprise or include the access right to utilize the protected wireless network. A rewards account may also include the access right to utilize the protected wireless network, or purchases by the user may determine the access right, such as purchases with a merchant offering the protected wireless network. The first access right may also be determined using an amount of time the user device is connected to the wireless beacon.

At step 406, the credential to access the protected wireless network is provided to the user based on the access right. The credential may be removed from the user device when the user device ends the connection with the wireless beacon or when the user device disconnects from the protected wireless network. Additionally, a transaction history documenting purchases by a user of the user device with a merchant may be received. A second access right to utilize the protected wireless network may be determined, wherein the second access right comprises a second credential that provides upgraded use of the protected wireless network over the first access right. The second credential may be provided to the user device. In other embodiments, the access level of the user device may be upgraded instead.

A unique identifier used to identify the user device on the protected wireless network may be determined. The unique identifier may be utilized with received receipts and/or transaction histories when storing the receipts/transaction histories for later use in determining access rights and/or access levels. Moreover, a loyalty account for a user of the user device may be determined using the unique identifier, where the loyalty account stores the receipt, transaction histories, and/or user shopping actions with a merchant by the user.

Figure 5:
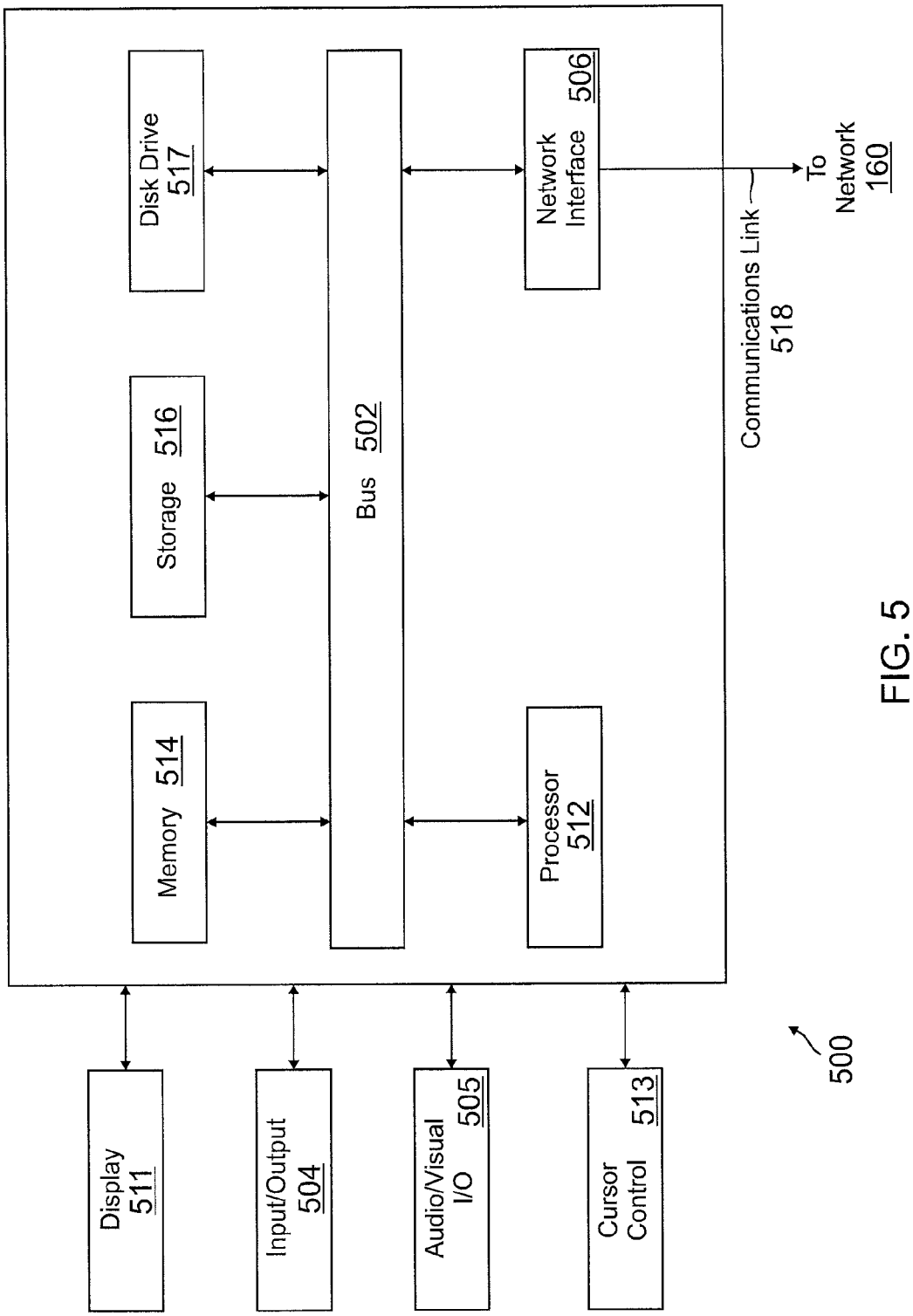
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, wearable computing device, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
  a non-transitory memory storing a credential for a protected wireless network; and
  one or more hardware processors in communication with the non-transitory memory and configured to:
    determine a user device for a user is in proximity to a network access device based on a connection between the user device and a wireless beacon corresponding to the network access device, wherein the network access device provides the protected wireless network requiring the credential;
    determine that the user device is entitled to access the protected wireless network using an access right for the user device;
    receive, from the wireless beacon, an identifier for the user received from the user device;
    determine a loyalty account status for the user using the identifier;
    determine a data transfer bandwidth for the user device over the protected wireless network using the loyalty account status;
    provide the credential to the user device for utilizing the protected wireless network based on the access right; and
    configure usage rights for the user device on the protected wireless network based on the data transfer bandwidth.

2. The system of claim 1, wherein the connection between the user device and the wireless beacon uses one of near field communication, radio communication, infrared communication, Bluetooth communication, Bluetooth low energy communication, LTE Direct communication, and WiFi communication.

3. The system of claim 1, wherein the one or more hardware processors are further configured to:
  receive a change in an access level to the protected wireless network; and
  reconfigure the usage rights based on the change in the access level.

4. The system of claim 3, wherein the change in the access level determines a security level or security clearance during use of the protected wireless network by the user device.

5. The system of claim 3, wherein the change in the access level changes a data transfer bandwidth, data transfer amount, or data transfer speed during use of the protected wireless network by the user device.

6. The system of claim 5, wherein a loyalty status change in the loyalty account status with a merchant for the user of the user device comprises the change in the access level, and wherein the loyalty account status further comprises benefits with the merchant that determine the change in the access level.

7. The system of claim 6, wherein the loyalty status change further comprises change in a transaction history with the merchant that determine the benefits.

8. The system of claim 1, wherein the protected wireless network comprises at least one of a secure media playback device, a wireless internet router, and a secure private computer network.

9. A method comprising:
  receiving check-in information comprising a request to access a protected wireless network provided by a network access device from a user device for a user when the user device is in proximity to a network access device, wherein the check-in information is received using a connection between the user device and a wireless beacon corresponding to the network access device, and wherein the protected wireless network requires a first credential to access the protected wireless network;
  determining, using one or more hardware processors, a first access right to utilize the protected wireless network for the user device;
  receiving, from the wireless beacon, an identifier for the user received from the user device;
  determining a loyalty account status for the user using the identifier;
  determining a data transfer bandwidth for the user device over the protected wireless network using the loyalty account status;
  communicating the first credential to the user device for utilizing the protected wireless network based on the first access right; and
  configuring usage rights for the user device on the protected wireless network based on the data transfer bandwidth.

10. The method of claim 9 further comprising:
  removing the first credential from the user device when the user device ends the connection with the wireless beacon.

11. The method of claim 9 further comprising:
  removing the first credential from the user device when the user device disconnects from the protected wireless network.

12. The method of claim 9 further comprising:
  determining a security rating for a user corresponding to the user device using the check-in information,
  wherein the security rating comprises the first access right.

13. The method of claim 9, wherein a rewards account for a user corresponding to the user device with a merchant comprises the first access right.

14. The method of claim 13 further comprising:
  receiving a transaction history for a purchase by the user with the merchant determining a second access right for the user using the transaction history, wherein the second access right comprises a second credential for the protected wireless network, and wherein the second credential provides upgraded use of the protected wireless network over the first credential; and communicating the second credential to the user device.

15. The method of claim 9 further comprising:

accessing purchases for a user corresponding to the user device while the user is at a merchant corresponding to the protected wireless network, wherein the first access right is determined using the purchases.

16. The method of claim 9 further comprising:

determining an amount of time the user device is connected to the wireless beacon, wherein the first access right is determined using the amount of time.

17. A non-transitory computer-readable medium comprising instructions which, in response to execution by a computer system, cause the computer system to perform a method comprising:

determining a user device for a user is requesting to access a protected wireless network provided by a network access device based on a connection between the user device and a wireless beacon corresponding to the network access device, wherein the protected wireless network requires a credential to access the protected wireless network;

determining an entitlement to access the protected wireless network from an access right for the user device;

receiving, from the wireless beacon, an identifier for the user received from the user device;

determining a loyalty account status for the user using the identifier;

determining a data transfer bandwidth for the user device over the protected wireless network using the loyalty account status;

transmitting the credential to the user device for utilizing the protected wireless network based on the access right; and configuring usage rights for the user device on the protect wireless network based on the data transfer bandwidth.

18. The non-transitory computer-readable medium of claim 17, wherein the method further comprises:

receiving at least one receipt for purchases by a user corresponding to the user device; and storing the receipt with the identifier.

19. The non-transitory computer-readable medium of claim 17, wherein the loyalty account status is associated with a loyalty account for the user, and wherein the method further comprises:

storing user shopping actions with a merchant with the loyalty account.

* * * * *